United States Patent
Hauck et al.

(10) Patent No.: US 10,440,034 B2
(45) Date of Patent: Oct. 8, 2019

(54) NETWORK ASSISTED FRAUD DETECTION APPARATUS AND METHODS

(71) Applicant: Apple Inc., Cupertino, CA (US)

(72) Inventors: Jerrold Von Hauck, Windermere, FL (US); Li Li, Cupertino, CA (US); Stephan V. Schell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/762,074

(22) Filed: Feb. 7, 2013

(65) Prior Publication Data

US 2013/0205390 A1 Aug. 8, 2013

Related U.S. Application Data

(60) Provisional application No. 61/596,007, filed on Feb. 7, 2012.

(51) Int. Cl.
| | |
|---|---|
| *G06F 11/00* | (2006.01) |
| *H04L 29/06* | (2006.01) |
| *H04W 8/20* | (2009.01) |
| *H04W 12/12* | (2009.01) |
| *H04W 12/00* | (2009.01) |
| *G06F 12/14* | (2006.01) |

(52) U.S. Cl.
CPC ......... *H04L 63/1408* (2013.01); *H04W 8/205* (2013.01); *H04W 12/0023* (2019.01); *H04W 12/1206* (2019.01)

(58) Field of Classification Search
CPC ..... H04W 12/12; H04W 12/04; H04W 12/06; H04W 48/08; H04W 48/18; H04W 4/00; H04W 88/06; H04L 63/062; H04L 63/0853

USPC ......... 726/22; 455/411, 406, 417, 419, 433, 455/445; 370/328, 329, 338, 352; 713/168, 169

See application file for complete search history.

(56) References Cited

U.S. PATENT DOCUMENTS

| | | | |
|---|---|---|---|
| 7,539,309 B2 | 5/2009 | Stadelmann et al. | |
| 7,860,972 B2 * | 12/2010 | Ferguson | H04W 8/18 455/419 |

(Continued)

FOREIGN PATENT DOCUMENTS

| | | |
|---|---|---|
| CN | 1961602 A | 5/2007 |
| CN | 101796858 A | 8/2010 |

(Continued)

OTHER PUBLICATIONS

International Search Report and Written Opinion for PCT Application No. PCT/US2013/025193, dated Sep. 10, 2013.

(Continued)

*Primary Examiner* — Gary S Gracia
(74) *Attorney, Agent, or Firm* — Dickinson Wright RLLP

(57) ABSTRACT

Methods and apparatus for detecting fraudulent device operation. In one exemplary embodiment of the present disclosure, a device is issued a user access control client that is uniquely associated with a shared secret that is securely stored within the network and the access control client. Subsequent efforts to activate or deactivate the access control client require verification of the shared secret. Each change in state includes a change to the shared secret. Consequently, requests for a change to state which do not have the proper shared secret will be disregarded, and/or flagged as fraudulent.

18 Claims, 6 Drawing Sheets

(56) References Cited

U.S. PATENT DOCUMENTS

| | | | | |
|---|---|---|---|---|
| 8,295,812 B1* | 10/2012 | Jones | | H04M 1/72577 |
| | | | | 455/411 |
| 8,555,067 B2 | 10/2013 | Schell et al. | | |
| 8,660,608 B2 | 2/2014 | Schell et al. | | |
| 8,666,368 B2 | 3/2014 | Schell et al. | | |
| 8,738,729 B2 | 5/2014 | Haggerty et al. | | |
| 8,913,992 B2 | 12/2014 | Schell | | |
| 8,924,715 B2 | 12/2014 | Schell et al. | | |
| 8,996,002 B2 | 3/2015 | Rodgers et al. | | |
| 9,009,475 B2 | 4/2015 | Hauck et al. | | |
| 9,100,393 B2 | 8/2015 | Schell et al. | | |
| 9,100,810 B2 | 8/2015 | Schell et al. | | |
| 9,572,014 B2 | 2/2017 | Hauck et al. | | |
| 2002/0120860 A1* | 8/2002 | Ferguson | | H04W 8/18 |
| | | | | 726/5 |
| 2003/0009687 A1* | 1/2003 | Ferchau | | G06F 21/57 |
| | | | | 726/22 |
| 2003/0224823 A1* | 12/2003 | Hurst | | G06F 21/10 |
| | | | | 455/558 |
| 2004/0177341 A1* | 9/2004 | Fam | | G06F 8/60 |
| | | | | 717/121 |
| 2005/0090731 A1* | 4/2005 | Minogue | | H04L 63/08 |
| | | | | 600/407 |
| 2006/0009214 A1* | 1/2006 | Cardina | | H04W 8/22 |
| | | | | 455/432.3 |
| 2006/0154647 A1* | 7/2006 | Choi | | H04W 12/12 |
| | | | | 455/411 |
| 2007/0077966 A1* | 4/2007 | Huang | | H04W 12/06 |
| | | | | 455/558 |
| 2007/0140196 A1* | 6/2007 | Jeon | | H04L 63/1466 |
| | | | | 370/338 |
| 2007/0234034 A1* | 10/2007 | Leone | | H04W 12/0013 |
| | | | | 713/150 |
| 2007/0250711 A1* | 10/2007 | Storey | | H04W 4/18 |
| | | | | 713/168 |
| 2007/0270127 A1* | 11/2007 | Santoro | | H04W 12/1206 |
| | | | | 455/411 |
| 2007/0286373 A1* | 12/2007 | Pailles | | H04L 29/06 |
| | | | | 379/142.03 |
| 2008/0072314 A1* | 3/2008 | Frenette | | G08B 25/14 |
| | | | | 726/19 |
| 2008/0102956 A1* | 5/2008 | Burman | | G06Q 20/3224 |
| | | | | 463/42 |
| 2008/0118059 A1* | 5/2008 | Shenfield | | H04W 12/06 |
| | | | | 380/44 |
| 2008/0127161 A1* | 5/2008 | Atas | | G06F 9/44505 |
| | | | | 717/168 |
| 2008/0170690 A1* | 7/2008 | Tysowski | | H04L 51/14 |
| | | | | 380/270 |
| 2008/0318550 A1* | 12/2008 | DeAtley | | H04L 63/08 |
| | | | | 455/411 |
| 2009/0077643 A1* | 3/2009 | Schmidt | | H04W 8/265 |
| | | | | 726/6 |
| 2009/0125996 A1* | 5/2009 | Guccione | | H04L 63/0853 |
| | | | | 726/6 |
| 2009/0177882 A1* | 7/2009 | Saran | | H04L 63/0853 |
| | | | | 713/159 |
| 2009/0181662 A1* | 7/2009 | Fleischman | | H04W 8/183 |
| | | | | 455/419 |
| 2009/0239503 A1* | 9/2009 | Smeets | | H04L 63/06 |
| | | | | 455/411 |
| 2010/0029247 A1* | 2/2010 | De Atley | | H04W 8/265 |
| | | | | 455/411 |
| 2010/0130169 A1* | 5/2010 | Narayanaswamy | | H04L 63/08 |
| | | | | 455/411 |
| 2010/0135204 A1* | 6/2010 | Witzel | | H04L 67/16 |
| | | | | 370/328 |
| 2010/0210304 A1* | 8/2010 | Huslak | | G06Q 10/10 |
| | | | | 455/558 |
| 2010/0217615 A1* | 8/2010 | Brown | | H04L 67/24 |
| | | | | 705/1.1 |
| 2010/0223328 A1* | 9/2010 | Haataja | | H04L 67/22 |
| | | | | 709/203 |
| 2010/0285834 A1* | 11/2010 | Hutchison, IV | | H04L 67/16 |
| | | | | 455/550.1 |
| 2010/0311391 A1* | 12/2010 | Siu | | H04W 8/205 |
| | | | | 455/411 |
| 2010/0311468 A1* | 12/2010 | Shi | | H04M 15/8038 |
| | | | | 455/558 |
| 2011/0004549 A1* | 1/2011 | Gray | | G06F 21/572 |
| | | | | 705/40 |
| 2011/0028135 A1* | 2/2011 | Srinivasan | | H04M 3/42382 |
| | | | | 455/415 |
| 2011/0059773 A1* | 3/2011 | Neumann | | H04W 8/205 |
| | | | | 455/558 |
| 2011/0092253 A1 | 4/2011 | Arniel et al. | | |
| 2011/0162091 A1* | 6/2011 | Huang | | G06F 21/12 |
| | | | | 726/33 |
| 2011/0195751 A1* | 8/2011 | Atley | | H04W 8/265 |
| | | | | 455/558 |
| 2011/0269423 A1* | 11/2011 | Schell | | H04L 63/062 |
| | | | | 455/411 |
| 2011/0306318 A1* | 12/2011 | Rodgers | | H04W 8/183 |
| | | | | 455/410 |
| 2012/0011345 A1* | 1/2012 | Robertson | | G06F 21/72 |
| | | | | 712/42 |
| 2012/0081212 A1* | 4/2012 | Ishihara | | H04L 12/12 |
| | | | | 340/10.4 |
| 2012/0108202 A1* | 5/2012 | Zhou | | G06F 21/88 |
| | | | | 455/410 |
| 2012/0108206 A1 | 5/2012 | Haggerty | | |
| 2012/0108207 A1* | 5/2012 | Schell | | H04L 63/0853 |
| | | | | 455/411 |
| 2012/0108294 A1* | 5/2012 | Kaul | | G06K 7/0013 |
| | | | | 455/558 |
| 2012/0108295 A1 | 5/2012 | Schell et al. | | |
| 2012/0115441 A1* | 5/2012 | Schell | | H04L 63/0853 |
| | | | | 455/411 |
| 2012/0115442 A1* | 5/2012 | Dadu | | H04L 63/0853 |
| | | | | 455/411 |
| 2012/0129513 A1* | 5/2012 | van der Laak | | H04W 24/02 |
| | | | | 455/419 |
| 2012/0167207 A1* | 6/2012 | Beckley | | H04W 4/02 |
| | | | | 726/22 |
| 2012/0196569 A1* | 8/2012 | Holtmanns | | H04L 63/0428 |
| | | | | 455/411 |
| 2012/0254762 A1* | 10/2012 | Parmar | | G06Q 30/02 |
| | | | | 715/736 |
| 2012/0260095 A1 | 10/2012 | Von Hauck et al. | | |
| 2012/0309348 A1* | 12/2012 | De Atley | | H04L 63/08 |
| | | | | 455/410 |
| 2013/0023235 A1* | 1/2013 | Fan | | H04W 48/18 |
| | | | | 455/411 |
| 2013/0165073 A1* | 6/2013 | Madsen | | H04W 12/06 |
| | | | | 455/411 |
| 2013/0227646 A1 | 8/2013 | Haggerty et al. | | |

FOREIGN PATENT DOCUMENTS

| | | | | |
|---|---|---|---|---|
| EP | 1783997 | | 5/2007 | |
| EP | 1860858 A1 | | 11/2007 | |
| EP | 2271141 | | 1/2011 | |
| WO | WO 9941927 A2 * | | 8/1999 | H04Q 7/38 |
| WO | 2006091944 A2 | | 8/2006 | |
| WO | 2007056848 A1 | | 5/2007 | |
| WO | 2009031972 | | 3/2009 | |

OTHER PUBLICATIONS

Taiwanese Patent Application No. 102104967—Office Action dated Apr. 27, 2015.
European Patent Application No. 13722156.0—Office Action dated Feb. 1, 2017.
Chinese Application for Invention No. 201380016716.4—First Office Action and Search Report dated Aug. 2, 2017.
Indian Patent Application No. 5737/CHENP/2014—First Examination Report (FER) dated Nov. 24, 2018.

(56) References Cited

OTHER PUBLICATIONS

European Patent Application No. 13722156.0—Examination Report dated May 4, 2018.
Laurent Coureau (Orange): Embedded UICC "A High Level Remote Provisioning Architecture", GSMA, European Telecommunications Standards Institute (ETSI), 650, Route Des Lucioles; F-06921 Sophia-Antipolis; France, vol. SCP, Jul. 12, 2011, pp. 1-16, XP014099004.
Chinese Application for Invention No. 201380016716.4—Second Office Action dated Apr. 4, 2018.
European Patent Application No. 13722156.0—Office Action dated Mar. 21, 2019.

* cited by examiner

NETWORK ASSISTED FRAUD DETECTION APPARATUS AND METHODS

PRIORITY

This application claims priority to U.S. Provisional Patent Application Ser. No. 61/596,007 filed Feb. 7, 2012 and entitled "NETWORK ASSISTED FRAUD DETECTION APPARATUS AND METHODS", the foregoing being incorporated herein by reference in its entirety.

RELATED APPLICATIONS

This application is related to co-owned, co-pending U.S. patent application Ser. No. 13/093,722 filed Apr. 25, 2011 and entitled "APPARATUS AND METHODS FOR STORING ELECTRONIC ACCESS CLIENTS", Ser. No. 13/080,558 filed on Apr. 5, 2011 and entitled "APPARATUS AND METHODS FOR CONTROLLING DISTRIBUTION OF ELECTRONIC ACCESS CLIENTS", Ser. No. 12/952,089 filed on Nov. 22, 2010 and entitled "METHODS FOR PROVISIONING SUBSCRIBER IDENTITY DATA IN A WIRELESS NETWORK", Ser. No. 13/183,023 filed on Jul. 14, 2011 and entitled "VIRTUAL SUBSCRIBER IDENTITY MODULE DISTRIBUTION SYSTEM", Ser. No. 13/109,851 filed on May 17, 2011 and entitled "METHODS AND APPARATUS FOR ACCESS CONTROL CLIENT ASSISTED ROAMING", Ser. No. 13/079,614 filed on Apr. 4, 2011 and entitled "MANAGEMENT SYSTEMS FOR MULTIPLE ACCESS CONTROL ENTITIES", Ser. No. 13/111,801 filed on May 19, 2011 and entitled "METHODS AND APPARATUS FOR DELIVERING ELECTRONIC IDENTIFICATION COMPONENTS OVER A WIRELESS NETWORK", Ser. No. 13/080,521 filed on Apr. 5, 2011 and entitled "METHODS AND APPARATUS FOR STORAGE AND EXECUTION OF ACCESS CONTROL CLIENTS", Ser. No. 13/078,811 filed on Apr. 1, 2011 and entitled "ACCESS DATA PROVISIONING SERVICE", Ser. No. 13/287,874 filed on Nov. 2, 2011 and entitled "METHODS AND APPARATUS FOR ACCESS DATA RECOVERY FROM A MALFUNCTIONING DEVICE", Ser. No. 13/080,533 filed on Apr. 5, 2011 and entitled "SIMULACRUM OF PHYSICAL SECURITY DEVICE AND METHODS", and Ser. No. 13/294,631 filed on Nov. 11, 2011 and entitled "APPARATUS AND METHODS FOR RECORDATION OF DEVICE HISTORY ACROSS MULTIPLE SOFTWARE EMULATION", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", and Ser. No. 12/353,227 (now published as U.S. Patent Publication Number 2009/0181662) filed on Jan. 13, 2009, and entitled "POSTPONED CARRIER CONFIGURATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of communications systems, and more particularly in one exemplary aspect, to wireless systems that allow user devices to authenticate to wireless networks (e.g., cellular networks, WLANs, WMANs, etc.) using access control clients.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) in the exemplary UMTS context, executing on a physical Universal Integrated Circuit Card (UICC). The USIM authenticates the subscriber to the UMTS cellular network. After successful authentication, the subscriber is allowed access to the cellular network.

Common implementations of USIM software are based on the Java Card™ programming language. Java Card is a subset of the Java™ programming language that has been modified for embedded "card" type devices (such as the aforementioned UICC).

Traditionally, the USIM performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network. USIM based access control is limited to only a single Mobile Network Operator (MNO) at a time.

Existing USIM solutions are hard-coded to the physical UICC card media; the subscriber needs a new UICC to change USIM operation. This can be detrimental to both MNOs and subscribers; for example, if the authentication procedures are "broken" (e.g., via malicious "hacking" or other such activities), the subscriber must be issued a new UICC, and this process is both time-consuming and expensive.

Moreover, various practical considerations limit each physical UICC to only support a single USIM entity; existing solutions are not suitable for handling multiple USIM profiles within the same UICC.

For at least the foregoing reasons, improved solutions for security that do not rely on physical hardware are required. Ideally, such solutions would operate without a physical UICC, yet provide equivalent levels of fraud deterrence as their physical counterparts, and would be flexible in their ability to handle different SIM profiles.

SUMMARY

The present disclosure addresses the foregoing needs by providing, inter alia, apparatus and methods for user equipment to authenticate to wireless networks (e.g., cellular networks, WLANs, WMANs, etc.) using access control clients.

A method of executing a fraud protocol are disclosed. In one embodiment, the method includes extracting, such as responsive to receiving a request for activation, one or more data from the request, the extracted one or more data corresponding to a first activation state, verifying the one of more data based at least in part on the first activation state, and executing a fraud protocol in response to unsuccessful verification of the one or more data.

An appliance apparatus useful in the execution of a fraud detection protocol is also disclosed. In one embodiment, the appliance apparatus includes a processor, a state database configured to store activation state information for each respective access control client of a plurality of access control clients, and a computer readable apparatus having a non-transitory storage medium with at least one computer program stored thereon.

In one variant, the at least one computer program configured to, when executed on the processor, cause the appliance apparatus to receive an access control client request from a mobile device, the access control client request comprising at least activation state information, cause retrieval, from the state database, of current state information corresponding to the requested access control client, verify the validity of the request by at least a comparison of the activation state information against the retrieved current state information, and when the request is determined to be invalid, effectuate a fraud protocol.

A non-transitory computer readable medium is further disclosed. In one embodiment, the computer readable medium includes a plurality of instructions for detecting fraudulent device activation, the plurality of instructions that, when executed, cause a network entity to: receive a access control client request from a mobile device, the request comprising at least state information of the access control client and a secret key of the mobile device, determine if the at least state information corresponds to an expected state for the access control client, and if the secret key is valid, and when (1) the state information does not correspond to the expected state, and/or (ii) when the secret key is invalid, implement a fraud protocol for the access control client.

In another embodiment, the computer readable medium includes a plurality of instructions for detecting fraudulent device activation, the plurality of instructions that, executed, cause a mobile device to: transmit an access control client request to an activation service, the request comprising at least a current activation status of the access control client, receive a message from the activation service, where the message is configured to indicate a validity of the request, and when the message indicated that the request is invalid, implement a fraud procedure on at least the access control client.

A method for detecting fraudulent device activation is also disclosed. In one embodiment, the method includes transmitting a request for an access control client, receiving information associated with an access control client of the access control client request, validating the received information, and upon a validation of the received information, performing an action associated with the request for the access control client.

A mobile device configured for execution of a fraud detection protocol is additionally disclosed. In one embodiment, the mobile device includes a processor, a secure element configured to store one or more access control clients, at least one wireless interface in data communication with the processor, and a computer readable apparatus having a non-transitory storage medium with at least one computer program stored thereon.

In one variant, the at least one computer program is configured to, when executed on the processor, cause the mobile device to: transmit a request relating to an access control client, where the request comprises at least information related to an activation status of the access control client, receive a response indicative of a determined validity of the request, and execute a fraud protocol when the response is indicative of an invalid request.

A network architecture configured to execute a fraud detection protocol is also disclosed.

An access control client for use on a mobile device is further disclosed.

Other features and advantages of the present disclosure will immediately be recognized by persons of ordinary skill in the art with reference to the attached drawings and detailed description of exemplary embodiments as given below.

Figure 1:
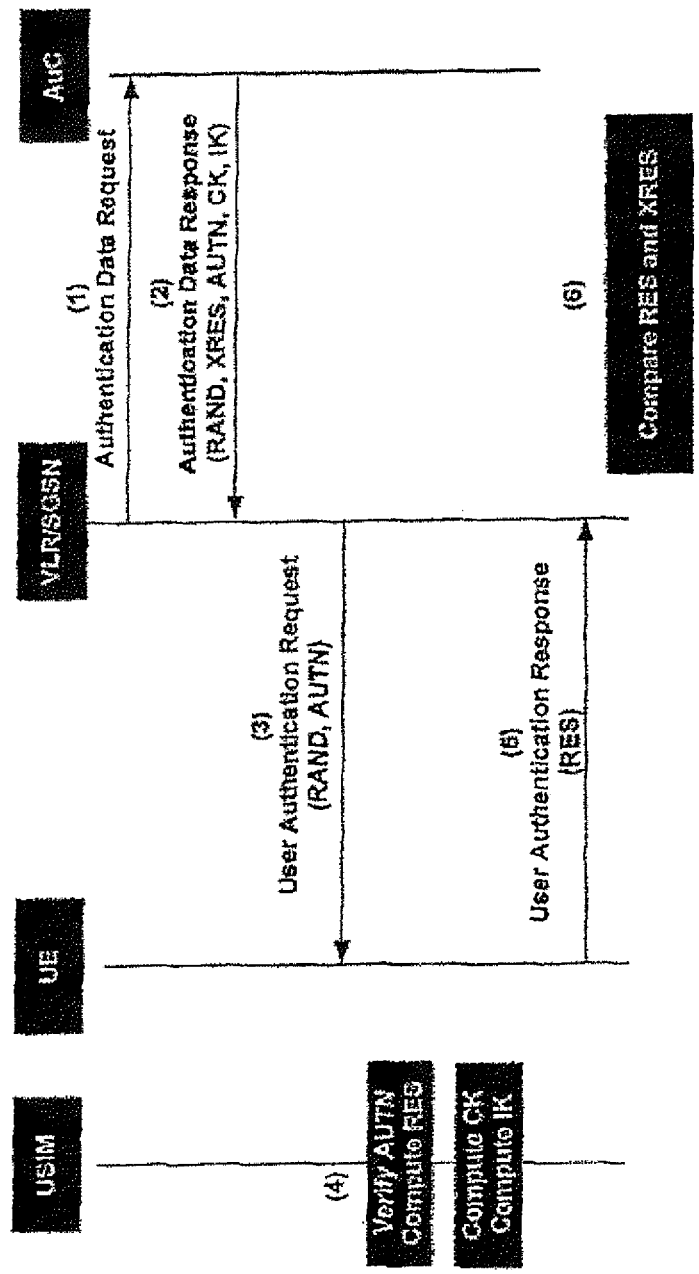
FIG. 1 illustrates an exemplary Authentication and Key Agreement (AKA) procedure using a prior art Universal Subscriber Identity Module (USIM).

All Figures © Copyright 2012-2013 Apple Inc. All rights reserved.

DETAILED DESCRIPTION

Reference is now made to the drawings wherein like numbers refer to like parts throughout.
Overview In one aspect, the present provides methods and apparatus for detecting fraudulent device operation. In one exemplary embodiment, a device (such as a wireless mobile device) is issued a user access control client, and the access control client is uniquely associated with a shared secret that is securely stored within the network and the access control client. Subsequent efforts to activate or deactivate the access control client require verification of the shared secret. In one variant, each change in state (e.g., activated, deactivated, etc.) includes a change to the shared secret. As described in greater detail hereinafter, the exclusionary property of the shared secret ensures that a user can have only one access control client active at a time. Consequently, requests for a change to state which do not have the proper shared secret will be disregarded, flagged as fraudulent, and/or even cause partial or total disablement of the device.

In one exemplary implementation of the disclosure, a user is issued an access client (e.g., Electronic Subscriber Identity Module (eSIM)), the eSIM is associated with a state (e.g., active, inactive), and a hidden synchronization variable which is stored at e.g., an authorization center, etc. The user has one or more user equipment (UEs), which comprise a virtualized Electronic Universal Integrated Circuit Card (eUICC), and are configured to receive and store the eSIM.

The user can retrieve the issued eSIM from a network appliance (e.g., SIM Provisioning Service (SPS), peer device, etc.), and activate the eSIM to enable the UE for normal operation. The authorization center is configured such that only activation requests that have the most current synchronization variable are further processed or granted.

Detailed Description of Exemplary Embodiments

Exemplary embodiments of the present disclosure are now described in detail. While these embodiments are primarily discussed in the context of Subscriber Identity Modules (SIMs) of a GSM, GPRS/EDGE, UMTS cellular network, it will be recognized by those of ordinary skill that the present disclosure is not so limited. In fact, the various aspects of the disclosure are useful in any network (whether cellular or otherwise) that can benefit from detecting fraudulent network transactions.

Prior Art Subscriber Identity Module (SIM) Operation—

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (FIN). The HN compares the received IMSI with the AuC's registry and obtains the appropriate K. The HN generates a random number (RAND), and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

The foregoing procedure of FIG. 1 is embodied within the physical media of the prior art SIM card. Prior art SIM cards have at least two (2) distinct and desirable properties: (i) SIM cards provide cryptographically secured physical storage for SIM data (e.g., account information, encryption keys, etc.), and (ii) SIM cards cannot be easily cloned.

A prior art SIM card includes a processor and memory formed in a Universal Integrated Circuit Card (UICC). The SIM card may be filled with epoxy resin to prevent external probing of data signals on the UICC. Other tamper-proof structures may be included in the UICC if desired (e.g., shielding layers, masking layers, etc.) The SIM card has a secure interface to the processor, and the processor has an internal interface to the memory. The UICC receives power from the external device, which enables the processor to execute code from the memory component. The memory component itself is not directly accessible (i.e., internal file systems are hidden from the user), and must be accessed via the processor.

During normal operation, the processor accepts a limited number of commands. Each of the commands is only conditionally accessible. Access conditions are constrained to the execution of commands to prevent unauthorized access. Access conditions may or may not be hierarchical; e.g., authorization for one level or area or function may not automatically grant authorization for another level or area or function. For example, one set of access conditions may include: (i) always accessible, (ii) never accessible, (iii) accessible to a first account, (iv) accessible to a second account, etc. Conditional access is granted only after successful completion of an appropriate security protocol. Common methods for verifying identity may include a password or Personal Identification Number (PIN), challenge of a shared secret, etc.

Use of conditional access, limited command set, and protected memory space ensure that the information stored within the SIM card is secure from external access. Cloning a SIM card would entail construction of a physical card, and construction of the internal file system and data. The combination of these features renders the physical SIM card largely impervious to practical forgery attempts.

However, the physical nature of the UICC also has several drawbacks. For example, the physical card form factor of the UICC requires a card receptacle within a host device or reader for reading UICC operation. Similarly, UICCs are hardcoded for operation. Accordingly, the operation of the UICC cannot be changed post deployment (e.g., adding or removing SIMs, updating firmware, changing privileges, etc.) For at least these reasons, current areas of development are directed to alternative mechanisms for SIM delivery and use.

Electronic Subscriber Identity Module (eSIM) Operation—

Operation of exemplary embodiments of access clients (e.g., eSIMs) is now described in detail.

As a brief aside, the terms "conservation", "conserve" and "conserved", as used herein refer to an element (either physical or virtual), that cannot be trivially multiplied or diminished. For example, a conserved eSIM cannot be copied or replicated during normal operation.

Additionally, as used herein, the terms "uniqueness" as applied to an element (either physical or virtual), refers to the property whereby the element is the one and only element having a particular property and/or characteristic. For instance, a unique eSIM cannot have a duplicate eSIM.

As used herein, the term "security" generally refers to protection of the data and/or software. For example, access control data security ensures that the data and/or software associated with an access control client is protected from theft, misuse, corruption, publication and/or tampering, by unauthorized activities, and/or malicious third parties.

Moreover, as used herein, the term "user authorization" generally refers to specifying a user's access to resources.

Generally, it is appreciated that software is more flexible than hardware; for example, software is easy to copy, modify, and distribute. Additionally, software can often be made cheaper, more power efficient, and physically smaller than hardware equivalents. Accordingly, while conventional SIM operation makes use of physical form factors such as cards (UICCs), current areas of development are focused toward virtualizing SIM operation within software. However, the highly sensitive nature of SIM data (e.g., subscriber-specific information, etc.) requires special consideration. For example, various portions of SIM data are unique to subscribers, and should be carefully guarded from malicious third parties or surreptitious use or distribution. Moreover, each SIM represents a contracted-for amount of access to finite network resources; thus, duplication, destruction, and/or reclamation of SIMs must be managed to prevent over and/or under utilization of network resources, as well as subrogation of service provider fees or revenue. Accordingly, virtualized access clients such as eSIMs should satisfy the following properties: (i) security, (ii) uniqueness, and (iii) conservation. Moreover, such properties should ideally be afforded at least at a cost comparable to existing network infrastructures.

Incipient solutions for SIM operation emulate an UICC as a virtual or electronic entity such as e.g., a software application, hereafter referred to as an Electronic Universal Integrated Circuit Card (eUICC). The eUICC is capable of storing and managing one or more SIM elements, referred hereafter as Electronic Subscriber Identity Modules (eSIM). However, solutions for virtualized eSIM operation must provide equivalent (if not improved) security to existing security capabilities already provided by UICCs. Additionally, the existing infrastructure requires suitable methods for enforcing conservation of virtualized eSIMs, such that the number of virtualized eSIMs is controlled throughout the network (i.e., virtualized eSIMs are not duplicated, lost, etc.).

Figure 2:
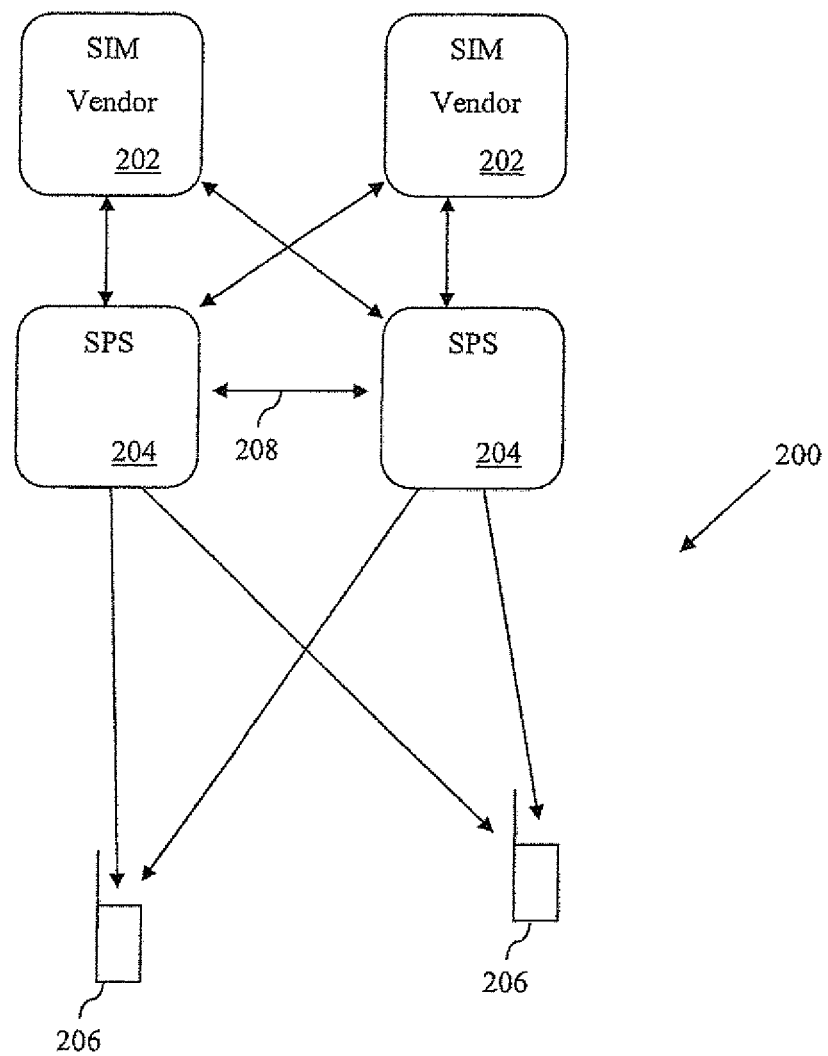
FIG. 2 is a block diagram of one exemplary network architecture used for distributing access control clients.

Consider the system illustrated in FIG. 2; the system 200 includes: (i) a number of SIM vendors 202, (ii) a number of SIM provisioning servers (SPSs) 204 (such as those described in greater detail in co-owned and co-pending U.S. patent application Ser. No. 12/952,082 filed on Nov. 22, 2010 and entitled "WIRELESS NETWORK AUTHENTICATION APPARATUS AND METHODS", and Ser. No. 12/952,089 filed on Nov. 22, 2010 and entitled "APPARATUS AND METHODS FOR PROVISIONING SUBSCRIBER IDENTITY DATA IN A WIRELESS NETWORK", previously incorporated by reference), and (iii) a population of user equipment (UE) 206, where each UE contains a secure eUICC. The following discussions describe different schemes for distributing eSIMs from the SIM vendor to the secure eUICC.

In a first scheme, the UE 206 requests an eSIM from any SPS 204, and the SPS retrieves an appropriate eSIM from the SIM vendor 202. In this approach, the SIM vendor can easily control the distribution of eSIMs; each newly requested eSIM is granted only by the SIM vendor. However, since the SIM vendor is the only party that can dispense eSIMs, the SIM vendor can create "bottlenecks" if a large population of subscribers flood the SIM vendor with requests within a short period of time (as is common for successful product releases).

In a second scheme, each SPS 204 retrieves a pool of eSIMs from the SIM vendor 202, and stores the pool of eSIMs within each SPS (the pool of eSIMs is duplicated for each SPS). Thereafter, the SPS distributes the eSIMs to UEs 206 on request. The eSIM can only be decrypted and used by the secure eUICC. This distributed SPS server model is not bottlenecked by the SIM vendor. However, this second scheme requires substantially more infrastructure. Specifically, the population of SPSs must ensure that no duplicated eSIMs are distributed. Accordingly, whenever an SPS grants an eSIM, the other SPSs must deactivate their duplicate eSIMs via communication link 208. This ensures that the eSIMs are unique (i.e., no duplicate eSIMs have been distributed). The communication to retain eSIM state information synchronization between the SPSs is a significant amount of traffic on network infrastructure.

In yet a third scheme (not shown), the SPS 204 and SIM vendor 202 infrastructures are combined in some fashion. For example, the SIM vendor and SPS network may be housed together in a common facility and freely access one another, or are otherwise logistically intertwined. Successful operation of intertwined facilities requires a trusted business relationship between the SIM vendor and the SPS network operator, which may in some cases be undesirable (e.g., where business concerns conflict, due to legal anti-trust considerations, etc.).

Methods—

Accordingly, various aspects of the present disclosure advantageously enable fraud detection in the context of virtualized access control client operation and distribution. Moreover, as described in greater detail herein, embodiments of the present disclosure are not specific to any particular network infrastructure, and can flexibly accommodate virtually any configuration.

In one aspect, the fraud detection schemes described herein take advantage of the fact that an access control client can be stored and transferred only to one secure element at a time. The use and distribution of virtualized access control is described in, for example, co-owned and co-pending U.S. patent application Ser. No. 13/093,722 filed Apr. 25, 2011 and entitled "APPARATUS AND METHODS FOR STORING ELECTRONIC ACCESS CLIENTS", previously incorporated by reference.

As a brief aside, a secure element may be embodied as a processor or processing apparatus executing software from a protected storage medium. In some variants, the protected storage medium is encrypted or otherwise secured so as to preclude unauthorized access or tampering. Moreover, the secure element may be physically hardened or protected to prevent access to the storage medium and/or secure processor. Common examples of physical hardening may include a physical case or other mechanism primed to self destruct or render the device inaccessible in the event of unauthorized access attempts, and/or embedding circuits in a resin or other material to prevent external probing. The secure element of the present disclosure is configured to further limit and/or monitor/flag aberrant access, and in some variants prevent further use of all or part of a device.

In one exemplary embodiment of the present disclosure, a device is issued a user access control client that is uniquely associated with a shared secret that is securely stored both within the network and the secure element of the client device. Subsequent efforts to activate or deactivate the access control client require verification of the shared secret.

Each change in state (e.g., activated, deactivated, etc.) also includes a change to the shared secret. This exclusionary property of the shared secret ensures that a user can have only one access control client active at a time. Consequently, requests for a change to state which do not have the proper shared secret will be disregarded, and/or flagged as fraudulent. It will also be appreciated that while the foregoing embodiment of the method is structured around a shared secret associated with a single state variable, each access control client may possess multiple state variables if desired. For example, one state variable may relate to use attributes of the access client (e.g., "available", "stale", etc.), while other state variables may relate to or be descriptive of other types of attributes (e.g., state or values of permissions for access to various different services, such as "voice only", "voice and data", "data only", "roaming", "non-roaming", etc.).

Figure 3:
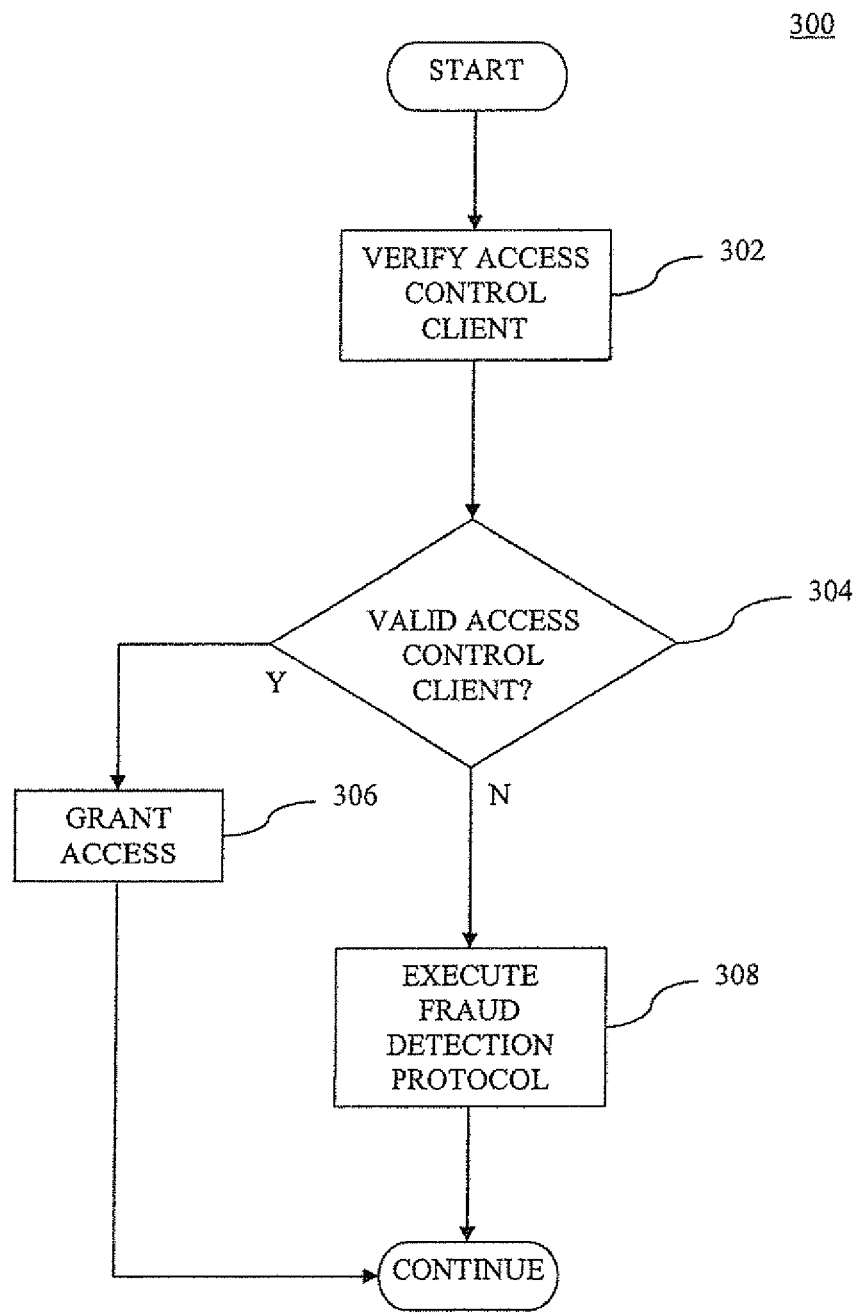
FIG. 3 is a logical flow diagram illustrating one embodiment of a generalized method for executing a fraud detection protocol according to the present disclosure.

Referring now to FIG. 3, one embodiment of a generalized method 300 for executing a fraud detection protocol associated with the aforementioned access control client and according to the disclosure is shown. At step 302 of the method 300, the access control client is examined during a verification process. This verification process is, in an exemplary embodiment, executed during a change in state (e.g., activated and/or deactivated, etc.). In one variant, in order to ensure that conservation and uniqueness properties of an access control client are retained during a change in state, the internal states of the access control client and the shared secret associated therewith are synchronized between the activation service. In addition, only one copy of the access control client is allowed to be active at a time. In this manner, devices attempting to access a network must not only know the information necessary for authentication to the network (see e.g. FIG. 1 supra), but must also maintain synchronization of state (e.g. through a shared secret) with the activation service.

For example, in one exemplary embodiment, the source device transfers the access control client to the destination device. In addition to transferring the access control client, the source device also flags the transfer to the activation service. Thereafter, the destination device receives the state update (and associated shared secret) from the activation service. Accordingly, any subsequent attempts to access the network must prove knowledge of this state update.

Alternately, and in another variant, the source device transfers the access control client to the destination device. The destination device notifies the activation service that it wishes to be verified, and subsequently receives a shared secret update indicative of state. Thereafter, any subsequent attempts to access the network must prove knowledge of this shared secret. It will be appreciated that the state notification or shared secret update may be accomplished at different times, as may be convenient or required under the various scenarios. In some embodiments, state updating may occur some time after transfer. Such embodiments may be of particular use in bulk transfers.

Generally, a shared secret is a piece of data that is used to verify two parties to one another (e.g., the destination device, the network, etc.) in a secure communication. The shared secret can be a password, a passphrase, a big number or an array of randomly chosen bytes. Other common examples of shared secrets include without limitation: incrementing/decrementing counts, cryptographic hashes. In some cases, the shared secret may be further obfuscated with an initialization vector (IV).

In addition, a "validity window" may also be specified, such that a particular notification or update must be accomplished within a prescribed temporal window to be considered valid. For example, a vendor knows that once a product is ordered and shipped that it takes two days for the device to reach the customer. Accordingly, the activation service may only accept verification requests that occur within forty-eight (48) to ninety-six (96) hours after shipment, as this is the expected window where the access control client on the device is expected to be activated. In addition to the use of validity windows during the initial ordering of products, it is appreciated that other validity windows would be readily apparent to one of ordinary skill given the present disclosure. For example, a validity window could be delayed from time of distribution of the device (i.e., not immediately available), prescribed upon receiving a request from a user to transfer access control clients between devices, occur only during certain recurring events (e.g., first of each month), etc.

At step 304, a decision is made about whether or not the access control client is valid by, for example, ensuring that the both the authentication data of the access control client and the shared secret is valid. In addition, this determination may have to occur within the aforementioned validity window although this is by no means a requirement. If the access control client is valid, then access is granted at step 306. However, if the access control client is not valid, then a fraud detection and/or mitigation protocol is executed at step 308.

The use of various fraud detection and/or mitigation protocols provides a number of benefits to network operators and/or network subscribers. In one exemplary embodiment, the detection of an invalid access control client by the activation service can be used to notify the subscriber of potential fraud associated with a user's account. For example, if a user's access control client is compromised, and another entity attempts to reuse the user's access control client by gaining access to the network with another device, the user can be notified via an e-mail message, phone call, or a short message service (SMS) text message. The user can then take appropriate action to ensure that they are not responsible for any actions resultant from the fraudulent use of their access control client data.

In addition to, or as alternative to user notification, the activation service can also notify the network operator of any abnormal or malicious activity resultant from the attempted use of fraudulent access control client data. For example, the execution of fraud detection protocols can be used to block denial of service attacks against the network in which repeated replay attacks or other attacks are made to, inter alfa, exhaust network resources. In one exemplary implementation, the activation service maintains an association between an access control client and the identity (e.g. ICC-ID) of the device attempting to gain access. If the access attempts are determined to be abnormal or fraudulent, the network can simply ignore any repeated requests from the device by blocking access to the identity that has been associated with the fraudulent attempt to gain access.

In addition to those specific methodologies described above, the network operator can also transmit a disabling signal to the device that is the source of the abnormal or malicious activity. For example, the operator can corrupt the firmware on the device so that the device will not operate as intended. The device will then be rendered useless until the owner contacts the network operator to remedy the issue. By disabling the device and requiring the user of the device to contact the network operator, those users who are participating in malicious activity on the network, such as executing denial of service attacks or attempting to clone an access control client, will be left with a non-functioning device. Conversely, if the device was disabled by mistake, the user can easily remedy the situation by contacting their network operator. It will be recognized, however, that the present disclosure contemplates both permanent and non-permanent disabling approaches, or combinations thereof (e.g., upon expiration of a time limit for restoration, or occurrence of a follow-on event associated with the ICC-ID or access client, a non-permanent disablement can be made permanent).

Example Operation—

Figure 4:
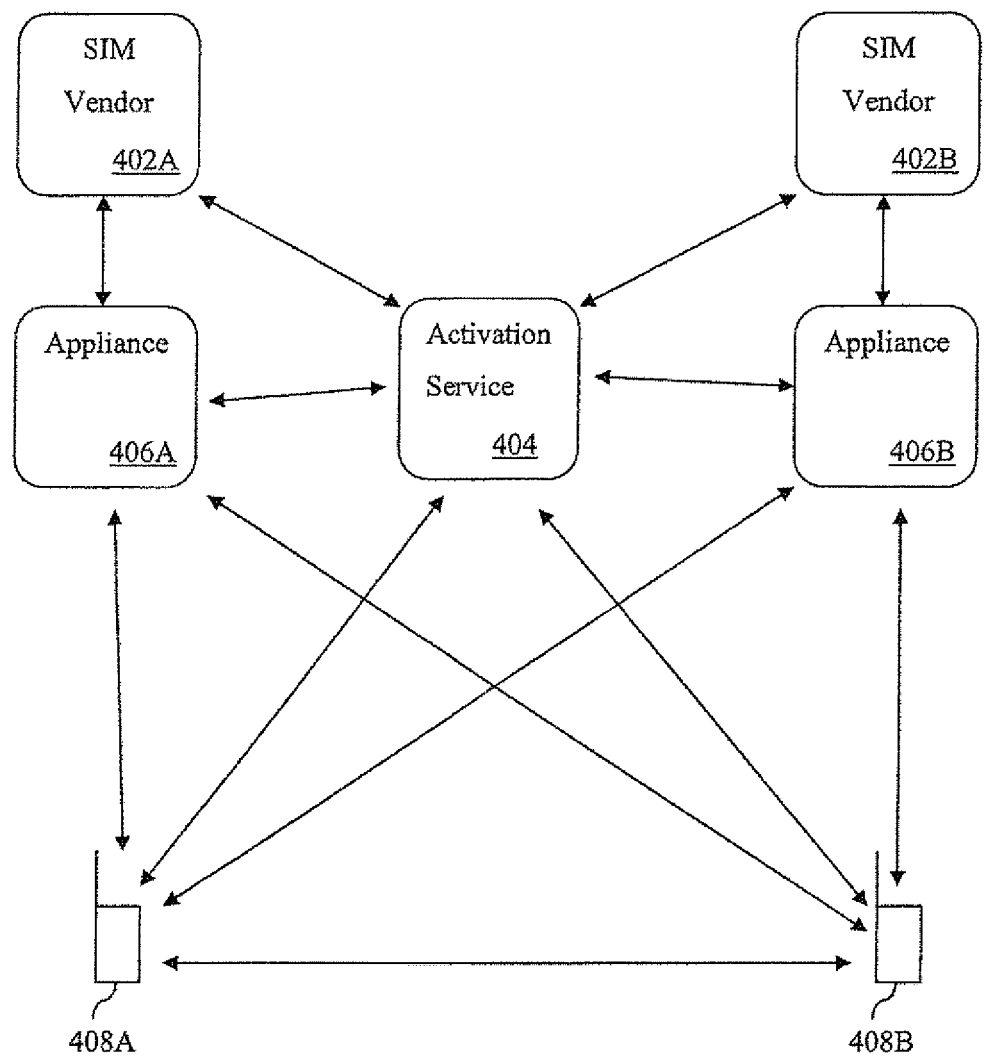
FIG. 4 is a block diagram illustrating one embodiment of a network architecture useful for the execution of a fraud detection protocol according to the present disclosure.

FIG. 4 illustrates one embodiment of exemplary network architecture useful with the present disclosure. As shown, the network architecture includes a number of access client (e.g., eSIM) vendors 402, a number of activation services 404, a number of eUICC appliances 406, and a number of mobile devices 408, although more or less of each may be present.

The UE 408A requests an eSIM from the network and the request is forwarded to appliance 406A. The appliance retrieves an appropriate eSIM from the SIM vendor 402A and forwards this eSIM back towards the UE 408A. The user of the UE 408A then activates the received eSIM. This activation request is forwarded onto the activation service 404. Along with other data present within the eSIM, the internal states of the eSIM and the shared secret associated therewith are synchronized between the activation service 404 and the UE 408A. The eSIM associated with UE 408A has now been activated by the network and the user of UE 408A can now access network resources.

Subsequent to activation, UE 408B attempts to gain access to the network using cloned eSIM data associated with UE 408A. The request by UE 408B is forwarded onto the activation service 404 so that this cloned eSIM data can be verified. As the eSIM data and state information from UE 408B does not match up with that information stored in the activation service 404, a fraud detection protocol is executed by the network. The ICC-ID associated with UE 408B is flagged by the network and the user of UE 408A is sent an SMS message notifying them of the fraudulent access attempt. The user and/or the network then take appropriate steps in response to the execution of the fraud detection protocol.

Apparatus—

Various apparatus useful in conjunction with the above described methods are now described in greater detail.

eUICC Appliance

Figure 5:
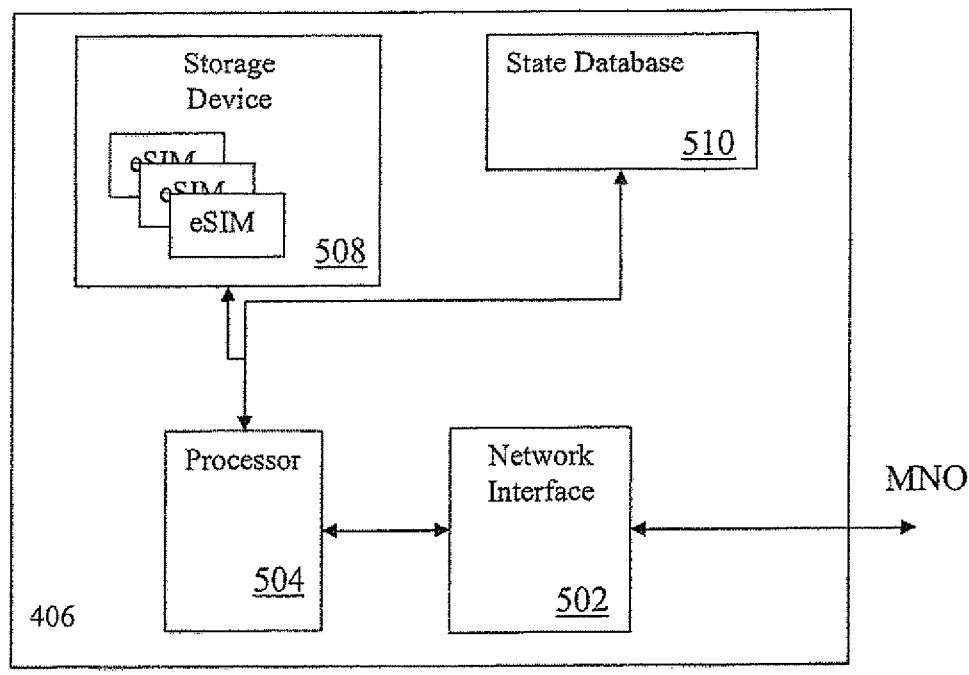
FIG. 5 is a block diagram illustrating one embodiment of a eUICC appliance adapted to store one or more access control clients, in accordance with the present disclosure.

Referring now to FIG. 5, one exemplary embodiment of a eUICC appliance 406 in accordance with the present disclosure is illustrated. The eUICC appliance may comprise a stand-alone entity, or be incorporated with other network entities (e.g., a Service Provisioning Service (SPS), etc.). As shown, the eUICC appliance generally includes a network interface 502 for interfacing with the communications network, a processor 504, and a storage apparatus 508. The network interface is shown connecting to the MNO infrastructure, so as to provide access to other eUICC appliances, and direct or indirect access to one or more mobile devices, although other configurations and functionalities may be substituted.

In one configuration, the eUICC appliance is a Hardware Security Module (HSM). A HSM includes one or more secure elements for storing a number of access control clients. The HSM is configured to enable transfer of access control clients to and from another HSM, while preserving the uniqueness and conservation of the access control clients. Moreover, transfer of the access control clients to another HSM in this embodiment causes a deactivation and/or deletion of the locally stored access control clients. An HSM can also be configured to self-destruct or permanently/non-permanently disable itself if tampered with.

In the illustrated embodiment of FIG. 5, the eUICC appliance includes at least a state database 510 running on the processor 504. Although illustrated as a single application running on the eUICC appliance, it is appreciated that the foregoing database functionality may comprise a distributed application running on a plurality of devices in data communication with one another.

The state database application processes requests that include: (i) a request to store an eSIM, (ii) a request to transfer a currently stored eSIM. The database application is also responsible for verifying requests to ensure that communication is received from an entity authorized to make such a request.

In one embodiment, the state database application is configured to execute a challenge and response security protocol. The challenge response security protocol is configured to verify requests made by an unknown third party, based on appropriate generation of challenges and/or responses. Alternately, in another embodiment, the secure element can verify a digital certificate signed by a trusted authority.

As shown, the storage apparatus 508 is adapted to store an array of access control clients. In one embodiment, an eUICC appliance stores an array of eSIMs. In one such implementation, each eSIM includes a small file system that includes computer readable instructions (the eSIM program) and associated data (e.g., cipher keys, integrity keys, etc.). In addition, each eSIM is additionally encrypted with the eUICC appliance's public key. Accordingly, each eUICC can only be decrypted by the eUICC appliance. In some embodiments, each encrypted eSIM is further encrypted with a unique identifier, challenge, or challenge response. In some embodiments, the encrypted components is further stored as a Binary Large Object (BLOB).

The state database application is configured to manage the available eSIMs. As illustrated in FIG. 5, the database may provide information relating to the particular eSIM BLOB, the devices authorized to use the eSIM, the current state and/or the current status of the eSIM ("available", "not available", "stale", etc.). Additional information may be maintained as well.

The database application is configured to update or change information stored in the database. The SIM database application, in one exemplary embodiment, is responsible for storing secret and generating a new shared secret upon the change the state of an access control client (e.g. activation, deactivation, etc.). The eUICC appliance will provide the requesting device with the new shared secret over the network interface 502 while associating the new shared secret with the respective access control client and storing it the state database 510. In one variant, the shared secret key is generated by another trusted network entity and delivered to the eUICC appliance to store and deliver to the requesting device.

When a device requests an eSIM from the eUICC appliance, the database application retrieves the shared secret of the requested eSIM. This information is used to determine if the requested eSIM can be provided and if any suspected fraud has occurred. This validity check can be performed at the eUICC appliance, be shared, or occur at yet other locations; e.g., by comparing the shared secret provided by the requesting device versus the shared secret stored at the eUICC appliance or another trusted entity.

User Apparatus

Figure 6:
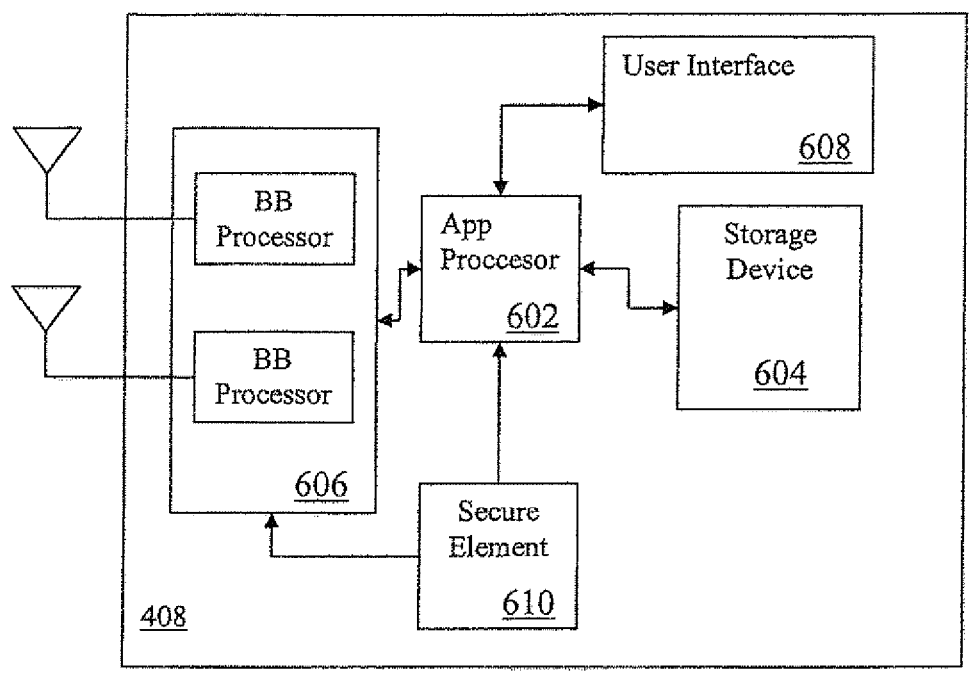
FIG. 6 is a block diagram illustrating one embodiment of a mobile device adapted to store and use one or more access control clients, in accordance with the present disclosure.

Referring now to FIG. 6, exemplary user apparatus or mobile device 408 (e.g., a UE) in accordance with various aspects of the present disclosure is illustrated.

The exemplary UE apparatus of FIG. 6 is a wireless device with an application processor 602 that may comprise a digital signal processor, microprocessor, field-programmable gate array, or plurality of processing components mounted on one or more substrates. The processing subsystem may also comprise an internal cache memory. The processing subsystem is in communication with a memory subsystem 604 including memory which may for example, comprise SRAM, flash, and/or SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device can comprise of one or more wireless interfaces 606 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 608 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 610, which contains and operates the eUICC application. The eUICC is capable of storing and accessing a plurality of access control clients to be used for authentication with a network operator. The secure element includes in this embodiment a secure processor executing software stored in a secure media. The secure media is inaccessible to all other components (other than the secure processor). Moreover, the secure element may be further hardened to prevent tampering (e.g., encased in resin) as previously described.

The secure element 610 is capable of receiving and storing one or more access control clients. In one embodiment, the secure element stores an array or plurality of eSIMs and the shared secret associated with each eSIM for use in fraud detection as discussed supra. Each eSIM includes a small files system including computer readable instructions (the eSIM program), and associated data (e.g., cipher keys, integrity keys, etc.).

The secure element is further adapted to enable transfer of eSIMs to and/or from the mobile device. In one exemplary embodiment, the mobile device provides a GUI-based acknowledgement to initiate transfer of an eSIM. Each transfer event is additionally notified to the eUICC appliance, such as via one of the device's wireless interfaces. The eUICC appliance ensures that only the mobile device with an eSIM with a valid secret key can be transferred; and eSIM requests containing an invalid key can be rendered non-functional.

Once the user of the mobile device opts to transfer or receive an eSIM, the mobile device sends a request for transfer to the eUICC appliance. The request identifies the eSIM, and includes the shared secret known by both the eUICC and the mobile device used for verification for authorized use. After the secret key is verified by eUICC appliance and determined to be valid, the eUICC appliance will permit the transfer of the eSIM for the mobile device. A new shared secret key is generated and provided to the mobile device for a future transfer request of the respective eSIM. The received shared secret is associated with the respective eSIM and stored within the secure element.

Finally, the mobile apparatus may also generate notifications to the eUICC appliance at every transfer event (transmission, receipt, etc.). Irregular or anomalous behavior with an eSIM may also be recognized and flagged to catch possibly illegal or unauthorized use of an eSIM.

It will be recognized that while certain aspects of the disclosure are described in terms of a specific sequence of steps of a method, these descriptions are only illustrative of the broader methods of the disclosure, and may be modified as required by the particular application, Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A method comprising:
   by an activation service network apparatus:
   receiving an access control client (ACC) request that originated at a mobile device, wherein the ACC request includes a request to change an ACC activation state associated with an ACC, and wherein the ACC request comprises a first shared secret and a first state value;
   performing a verification, wherein a successful verification requires both i) matching the first state value to an ACC activation state value and ii) matching the first shared secret to an ACC shared secret, wherein the ACC activation state value and the ACC shared secret are pre-stored by the activation service network apparatus at a trusted network entity prior to reception of the ACC request;
   when the verification is unsuccessful, executing a fraud detection protocol to detect possible unauthorized use of the ACC; and
   when the verification is successful:
   generating a new shared secret that corresponds to a changed ACC activation state associated with the ACC;
   sending the new shared secret to the mobile device; and
   storing, at the trusted network entity, the changed ACC activation state associated with the ACC and the new shared secret for verification of a subsequent ACC request from the mobile device.

2. The method of claim 1, wherein the ACC request comprises at least a request to activate an electronic subscriber identity module (eSIM) associated with a network service provider.

3. The method of claim 1, wherein:
the first state value is either active or inactive.

4. The method of claim 1, wherein:
the unsuccessful verification results when the first shared secret does not match the ACC shared secret.

5. An activation service network apparatus comprising:
one or more processors;
    an activation state database configured to store activation state information for a plurality of access control clients (ACC); and
    a computer readable apparatus having a non-transitory storage medium with executable instructions stored thereon, that when executed by the one or more processors, cause the activation service network apparatus to:
    receive, from a mobile device via an electronic Universal Integrated Circuit Card (eUICC) appliance network apparatus, an ACC request including a request to change an ACC activation state associated with an ACC, wherein the ACC request comprises a first state value and a first shared secret,
    cause retrieval of an ACC activation state value for the ACC from the activation state database,
    perform a verification, wherein a successful verification requires both i) matching the first state value to the ACC activation state value and ii) matching the first shared secret to an ACC shared secret, wherein the ACC activation state value and the ACC shared secret are pre-stored by the activation service network apparatus in the activation state database prior to reception of the ACC request, when the verification is unsuccessful: employ a fraud detection protocol that is configured to detect a possible unauthorized use of the ACC, and
when the verification is successful:
    generate a new shared secret that corresponds to a changed ACC activation state associated with the ACC;
    send the new shared secret to the mobile device; and
    store the changed ACC activation state associated with the ACC and the new shared secret in the activation state database for verification of a subsequent ACC request from the mobile device.

6. The activation service network apparatus of claim 5, wherein execution of the executable instructions by the one or more processors further causes the activation service network apparatus to update the activation state database when the verification is unsuccessful.

7. The activation service network apparatus of claim 5, wherein the fraud detection protocol is further configured to notify a network operator when the verification is unsuccessful.

8. A non-transitory computer readable medium comprising executable instructions for detecting fraudulent device activation, that when executed by one or more processors, cause an activation service network apparatus to:
    receive, from a mobile device via an electronic Universal Integrated Circuit Card (eUICC) appliance network apparatus, an access control client (ACC) request including a request to change an ACC activation state associated with an ACC, wherein the ACC request comprises a first shared secret and a first state value;
    perform a verification, wherein a successful verification requires both i) matching the first state value to an activation state value for the ACC and ii) matching the first shared secret to an ACC shared secret, wherein the ACC activation state value and the ACC shared secret are pre-stored by the activation service network apparatus at a trusted network entity prior to reception of the ACC request;
    implement a fraud detection protocol to detect possible cloned ACC data, when the verification is unsuccessful; and
when the verification is successful:
generate a new shared secret that corresponds to a changed ACC activation state associated with the ACC;
send the new shared secret to the mobile device; and
store the changed ACC activation state associated with the ACC and the new shared secret at the trusted network entity for verification of a subsequent ACC request from the mobile device.

9. A method comprising:
by a mobile device:
    transmitting a request associated with an access control client (ACC) to an activation service network apparatus via an electronic Universal Integrated Circuit Card (eUICC) appliance network apparatus, wherein the request comprises a request to change an ACC activation state associated with the ACC, an activation state of the ACC, and a shared secret associated with the ACC, wherein values for the ACC activation state and the shared secret associated with the ACC are pre-stored by the mobile device in a secure element of the mobile device and the activation service network apparatus at a trusted network entity prior to transmission of the request;
    receiving, from the activation service network apparatus, activation status information associated with a validity of the request that is determined based at least in part on the shared secret;
when the activation status information indicates the request is invalid, executing a fraud protocol to disable the ACC; and
when the activation status information indicates the request is valid:
receiving, from the activation service network apparatus, a new shared secret associated with the ACC; and
    storing the new shared secret in the secure element of the mobile device to use for validation of a subsequent request associated with the ACC.

10. The method of claim 9, wherein validity of the request is determined based at least in part on the ACC activation state associated with the ACC matching an activation state value associated with the ACC and maintained by the activation service network apparatus.

11. A mobile device configured to execute a fraud protocol, the mobile device comprising:
one or more processors;
a secure element storing one or more access control clients (ACC);
at least one wireless interface coupled with the one or more processors; and
a computer readable apparatus having a non-transitory storage medium with executable instructions stored thereon, that when executed by the one or more processors, cause the mobile device to:

transmit a request to an activation service network apparatus via an electronic Universal Integrated Circuit Card (eUICC) appliance network apparatus, wherein:
the request is associated with at least one ACC of the one or more ACCs stored in the secure element, and
the request comprises information related to an activation state of the at least one ACC and secret information for which values of the secret information and activation states of the at least one ACC are pre-stored in the secure element by the mobile device and at a trusted network entity by the activation service network apparatus prior to transmission of the request,
receive, from the activation service network apparatus, a response comprising activation status information indicative of a validity of the request that is determined based at least in part on the secret information,
when the response comprising the activation status information is indicative of an invalid request, disable the at least one ACC; and
when the activation response is indicative of a valid request:
receiving, from the activation service network apparatus, new secret information associated with the at least one ACC; and
storing the new secret information in the secure element for validation of a subsequent request associated with the at least one ACC.

12. The mobile device of claim 11, wherein:
execution of the executable instructions by the one or more processors further causes the mobile device to update the activation state of the at least one ACC when the response is indicative of an invalid request.

13. A non-transitory computer-readable medium comprising executable instructions for implementing a fraud protocol, that when executed by one or more processors, cause a mobile device to:
transmit an access control client (ACC) request to an activation service network apparatus via an electronic Universal Integrated Circuit Card (eUICC) appliance network apparatus, wherein the ACC request comprises a current activation state of an ACC and secret information for which values of the secret information and activation state of the ACC are pre stored by the mobile device in a secure element of the mobile device and by the activation service network apparatus at a trusted network entity prior to transmission of the request;
receive, from the activation service network apparatus, a response message indicating a validity of the ACC request that is determined based at least in part on the current activation state of the ACC;
when the response message indicates that the ACC request is invalid, disable the ACC; and
when the response message indicates that the ACC request is valid:
receive, from the activation service network apparatus, new secret information associated with the ACC; and
store the new secret information in the secure element of the mobile device for validation of a subsequent request associated with the ACC.

14. The method of claim 1, wherein executing the fraud detection protocol comprises sending an alert to the mobile device indicating potential fraud via at least one of an e-mail, a short message service (SMS) text message, or a phone call.

15. The method of claim 1, wherein performing the verification comprises determining whether the ACC request from the mobile device is received within a temporal window associated with the ACC.

16. The method of claim 15, wherein the temporal window is based on:
i) a date of an initial shipment of the mobile device, or
ii) a date of distribution of the mobile device.

17. The method of claim 1, wherein the fraud detection protocol comprises:
flagging an identity associated with the mobile device.

18. The method of claim 15, wherein the temporal window is based on a recurring temporal event.

* * * * *